US009034949B2

(12) United States Patent
Müller et al.

(10) Patent No.: US 9,034,949 B2
(45) Date of Patent: May 19, 2015

(54) METHOD FOR PRODUCING FLAME-PROOFED THERMOPLASTIC MOLDING COMPOUNDS

(75) Inventors: Matthias Müller, Pfungstadt (DE); Nortbert Güntherberg, Speyer (DE)

(73) Assignee: STYROLUTION EUROPE GMBH (DE)

( * ) Notice: Subject to any disclaimer, the term of this patent is extended or adjusted under 35 U.S.C. 154(b) by 110 days.

(21) Appl. No.: 13/879,246

(22) PCT Filed: Oct. 13, 2011

(86) PCT No.: PCT/EP2011/067919
§ 371 (c)(1),
(2), (4) Date: Jul. 9, 2013

(87) PCT Pub. No.: WO2012/049264
PCT Pub. Date: Apr. 19, 2012

(65) Prior Publication Data
US 2013/0274378 A1    Oct. 17, 2013

(30) Foreign Application Priority Data
Oct. 15, 2010 (EP) .................................. 10187680

(51) Int. Cl.
| C08G 59/42 | (2006.01) |
| C08J 3/20 | (2006.01) |
| B29C 47/00 | (2006.01) |
| B29C 47/10 | (2006.01) |
| B29C 47/60 | (2006.01) |
| B29C 47/38 | (2006.01) |
| B29K 105/00 | (2006.01) |
| C08K 7/24 | (2006.01) |

(52) U.S. Cl.
CPC ............ *C08J 3/203* (2013.01); *B29C 47/0004* (2013.01); *B29C 47/1045* (2013.01); *B29C 47/1081* (2013.01); *B29C 47/6087* (2013.01); *B29K 2105/0005* (2013.01); *B29K 2105/0026* (2013.01); *B29K 2995/0016* (2013.01); *B29K 2995/0059* (2013.01); *C08K 7/24* (2013.01); *B29C 47/0014* (2013.01); *B29C 47/0021* (2013.01); *B29C 47/38* (2013.01)

(58) Field of Classification Search
USPC .................................. 523/218, 324; 524/495
See application file for complete search history.

(56) References Cited

U.S. PATENT DOCUMENTS

| 3,737,409 | A | 6/1973 | Fox et al. |
| 3,751,460 | A | 8/1973 | Schliebs et al. |
| 4,403,075 | A | 9/1983 | Byrd et al. |
| 4,762,905 | A | 8/1988 | Schmidt et al. |
| 6,031,053 | A | 2/2000 | Knoll et al. |
| 6,124,394 | A | 9/2000 | Goto et al. |
| 6,165,399 | A | 12/2000 | Guntherberg et al. |
| 6,197,889 | B1 | 3/2001 | Knoll et al. |
| 6,420,442 | B1 | 7/2002 | Dietzen et al. |
| 6,444,714 | B1 | 9/2002 | Gluck et al. |
| 8,097,677 | B2 | 1/2012 | Breulmann et al. |
| 2010/0305253 | A1* | 12/2010 | Staal et al. ................. 524/139 |

FOREIGN PATENT DOCUMENTS

| DE | 2036173 A | 1/1972 |
| DE | 2925208 A1 | 1/1981 |
| DE | 3140520 A1 | 4/1983 |
| DE | 10016508 A1 | 10/2001 |
| DE | 10321081 A1 | 12/2004 |
| EP | 0008486 A1 | 3/1980 |
| EP | 0824134 A1 | 2/1998 |
| EP | 1567883 B1 | 6/2007 |
| GB | 2260335 A | 4/1993 |
| WO | 95/35335 A1 | 12/1995 |
| WO | 97/40079 A1 | 10/1997 |
| WO | 98/13412 A1 | 4/1998 |
| WO | 00/15718 A1 | 3/2000 |
| WO | 00/26274 A1 | 5/2000 |
| WO | 00/34342 A2 | 6/2000 |
| WO | 00/34367 A2 | 6/2000 |
| WO | 00/61664 A1 | 10/2000 |
| WO | 03/046071 A1 | 6/2003 |
| WO | 2009/007358 A1 | 1/2009 |
| WO | 2009/043758 A1 | 4/2009 |
| WO | 2012049264 A2 | 4/2012 |

OTHER PUBLICATIONS

PCT International Preliminary Report on Patentability of PCT International Application No. PCT/EP2011/067919, dated Apr. 16, 2013.
International Search Report for PCT International Application No. PCT/EP2011/067919 dated Nov. 29, 2012.
Korean Patent Abstracts, Publication No. 1000203633 B1, dated Mar. 24, 1999, corresponding to KR-A 10 1996 0001006.

* cited by examiner

*Primary Examiner* — Edward Cain
(74) *Attorney, Agent, or Firm* — J. A. Lindeman & Co., PLLC

(57) ABSTRACT

The invention relates to a method for producing thermoplastic molding compounds, comprising: A) 40 to 99 wt % of at least one thermoplastic polymer, B) 1 to 60 wt % of a flame-proofing agent component containing an expandable graphite, and C) 0 to 60 wt % of further additives, by melt-mixing components A), B) and C) in a screw-type extruder, wherein the screw-type extruder, along the feed direction, comprises, in the following order, at least one dosing zone, a plastifying zone, a homogenizing zone, a second dosing zone, and a discharge zone, in that the dosing takes place into the screw-type extruder having the length L, wherein the length L is defined as the section starting with the first dosing unit for adding components A, B and/or C and ending, in the feed direction, at the discharge opening, a melt is generated after adding components A, B and C in the range of 0 liter to 0.15 liter in a first method step in the presence of component B1), and in a second method step, after the addition of component B1) in the range of 0.5 liter to 0.95 liter, component B1) is mixed into said melt, wherein said method offers technical advantages.

17 Claims, No Drawings

METHOD FOR PRODUCING FLAME-PROOFED THERMOPLASTIC MOLDING COMPOUNDS

The invention relates to a process for the preparation of thermoplastic molding materials comprising
A) from 40 to 99% by weight of at least one thermoplastic polymer,
B) from 1 to 60% by weight of a flameproofing component comprising
    B1) an expandable graphite, and
C) from 0 to 60% by weight of further additives,
the percentages by weight being based in each case on the total weight of the components A) to C) and together giving 100% by weight, by mixing melts of the components A), B) and, if present, C) in a screw extruder, the screw extruder comprising at least one metering zone, one plasticating zone, one homogenization zone, one second metering zone and one discharge zone in this sequence along the conveying direction.

The metering takes place into the screw extruder having the length L, the length L being defined as the section beginning at the first metering means for the addition of components A, B and/or C and ending, in the conveying direction, at the exit opening, following addition of components A, B and optionally C in the region from 0 L to 0.15 L in a first process step in the absence of component B1), a melt being produced, and in a second process step after addition of the component B1) in the region from 0.5 L to 0.95 L the mixing of component B1) into this melt is carried out.

The present invention also relates to thermoplastic molding materials which can be prepared by these processes, the use of said thermoplastic molding materials for the production of fibers, films, moldings and foams, and these fibers, films, moldings and foams themselves.

Thermoplastic polymer materials treated with expandable graphite, which is also referred to as exfoliated graphite, as a flameproofing agent are known in the literature.

For example, according to WO 2003/046071, expandable graphite is used in polystyrene (PS) or impact polystyrene (HIPS). In addition, according to this publication, a halogen-containing compound in amounts of from 2 to 11%, calculated as halogen, is required as the further flameproofing component.

For example, for toxicological reasons, it is however desirable as substantially as possible to avoid using these halogen-containing flameproofing agents.

Thermoplastics flameproofed with the absence of halogen and comprising an expandable graphite and a phosphorus compound as flameproofing components are disclosed in WO 2000/34367 and WO 2000/34342. Molding materials based on styrene polymers flameproofed in this manner are, however, worthy of improvement with regard to their dripping behavior in the event of a fire.

Patent application KR-A 10 1996-0001006 discloses flameproofed polystyrene, the flameproofing components comprising expandable graphite, a phosphorus compound and Teflon. The mean particle size of the expandable graphite is 5 µm. The Teflon added as an antidrip agent is used in amounts of from 1 to 5 percent by weight. Molding materials flameproofed with the absence of halogen and obtained in this manner have good heat resistance and impact strength.

Thermoplastic molding materials likewise flameproofed with expandable graphite, a phosphorus compound and a fluorinated polymer are disclosed in WO 2009/007358, the polymer components being acrylonitrile/-butadiene/styrene copolymers (ABS) and acrylate/styrene/acrylonitrile copolymers (ASA).

It is often difficult in the case of thermoplastic molding materials which have been rendered flame-retardant with expandable graphite firstly to achieve sufficient flame retardancy and secondly to maintain good enough mechanical properties.

It is an object of the present invention to provide thermoplastic molding materials which are treated with expandable graphite and have an improved combination of flame-retardant and mechanical properties in comparison with known molding materials and an acceptable odor.

Accordingly, the processes defined at the outset were found.

The metering of the expandable graphite B1) into the screw extruder can be carried out according to the invention in the range from 0.5 L to 0.99 L, preferably in the range from 0.5 L to 0.95 L, particularly preferably in the range from 0.6 L to 0.9 L, in particular in the range from 0.7 L to 0.85 L of the overall length.

The thermoplastic molding materials prepared by the processes according to the invention and comprising at least one expandable graphite have an improved combination of flame-retardant and mechanical properties in comparison with known molding materials and a relatively low inherent odor.

The processes according to the invention and the further subjects according to the invention are described below.

The thermoplastic molding materials which can be prepared by the processes according to the invention comprise
A) from 40 to 99% by weight, preferably from 50 to 95% by weight, particularly preferably from 65 to 90% by weight, of component A,
B) from 1 to 60% by weight, preferably from 5 to 50% by weight, particularly preferably from 10 to 35% by weight, of component B and
C) from 0 to 60% by weight, preferably from 0 to 45% by weight, particularly preferably from 0 to 25% by weight, of component C,
the percentages by weight being based in each case on the total weight of the components A) to C) and together giving 100% by weight.

The flameproofing component B) can in principle consist exclusively of component B1), the expandable graphite. In a preferred embodiment of the invention, however, the flameproofing component B) comprises further components, in particular the components B2) and B3) also described below, in addition to the expandable graphite.

In one embodiment, the flameproofing component B) comprises in particular
B1) from 20 to 79.99% by weight, preferably from 30 to 69.9% by weight, particularly preferably from 40 to 59.5% by weight, of the component B1),
B2) from 20 to 79.99% by weight, preferably from 30 to 69.9% by weight, particularly preferably from 40 to 59.5% by weight, of the component B2) and
B3) from 0.01 to 4% by weight, preferably from 0.1 to 3% by weight, particularly preferably from 0.2 to 2% by weight, of the component B3),
the percentages by weight being based in each case on the total weight of the components B1) to B3) and together giving 100% by weight.

Component A):

In principle, all thermoplastic polymers or mixtures thereof known to the person skilled in the art and described in the literature are suitable as component A) of the thermoplastic molding materials.

For example,
polyolefins, such as polyethylene and polypropylene,
polyvinyl chloride,
styrene polymers, such as polystyrene (high-impact or non-high-impact),
impact-modified vinylaromatic copolymers, such as ABS (acrylonitrile/-butadiene/styrene), ASA (acrylonitrile/styrene/acrylate) and MABS (transparent ABS comprising methacrylate units),
styrene/butadiene block copolymers ("SBC"), in particular thermoplastic elastomers based on styrene ("S-TPE"),
polycarbonates (e.g. Makrolon® from Bayer AG),
polymethyl methacrylates (PMMA)
are suitable as component A).

One or more polymers selected from the group consisting of ASA, ABS and polystyrene can preferably be used as component A).

Preferred impact-modified vinylaromatic copolymers are impact-modified copolymers of vinylaromatic monomers and vinyl cyanides (in particular SAN). ASA polymers and/or ABS polymers as well as (meth)acrylate/acrylonitrile/butadiene/styrene polymers ("MABS", transparent ABS) are preferably used as impact-modified SAN but also blends of SAN, ABS, ASA and MABS with other thermoplastics, such as polycarbonate, polyamide, polyethylene terephthalate, polybutylene terephthalate, PVC and polyolefins.

ASA polymers are generally understood as meaning impact-modified SAN polymers in which elastomeric graft copolymers of vinylaromatic compounds, in particular styrene, and vinyl cyanides, in particular acrylonitrile, on polyalkyl acrylate rubbers are present in a copolymer matrix comprising in particular styrene and/or α-methylstyrene and acrylonitrile.

ABS polymers are generally understood as meaning impact-modified SAN polymers in which diene polymers, in particular 1,3-polybutadiene, are present in a copolymer matrix comprising in particular styrene and/or α-methylstyrene and acrylonitrile.

In principle, all styrene block copolymers known to the person skilled in the art and SBC described in the literature are also suitable as component A). S-TPE are preferably used, in particular those having an elongation at break of more than 300%, particularly preferably more than 500%, in particular from more than 500% to 600% (these and all other elongations at break and tensile strengths mentioned in this application are determined in the tensile test according to ISO 527-2:1996 on test specimens of type 1 BA (Appendix A of said standard: "Small test specimens")). Particularly preferably, a linear or star-shaped styrene/butadiene/block copolymer having external polystyrene blocks S and styrene/butadiene copolymer blocks in between, with a random styrene/butadiene distribution $(S/B)_{random}$ or a styrene gradient $(S/B)_{taper}$ is admixed as SBC or S-TPE (e.g. Styrolux® or in particular Styroflex® from BASF SE, K-Resin® from CPC). Further components C) are sold under the brands Cariflex®, Kraton®, Tufprene®, Asaflex®.

The total butadiene content of the SBC is preferably in the range from 15 to 50% by weight, particularly preferably in the range from 25 to 40% by weight, and the total styrene content is accordingly preferably in the range from 50 to 85% by weight, particularly preferably in the range from 60 to 75% by weight.

The styrene/butadiene block (S/B) preferably consists of from 30 to 75% by weight of styrene and from 25 to 70% by weight of butadiene. Particularly preferably, a block (S/B) has a butadiene content of from 35 to 70% by weight and a styrene content of from 30 to 65% by weight.

The proportion of polystyrene blocks S is preferably in the range from 5 to 40% by weight, in particular in the range from 25 to 35% by weight, based on the total block copolymer. The proportion of the copolymer blocks S/B is preferably in the range from 60 to 95% by weight, in particular in the range from 65 to 75% by weight.

Linear styrene/butadiene block copolymers of the general structure S-(S/B)-S with one or more blocks $(S/B)_{random}$ located between the two S blocks and having a random styrene/butadiene distribution are particularly preferred as component A). Such block copolymers are obtainable by anionic polymerization in a nonpolar solvent with addition of a polar cosolvent or of a potassium salt, as described, for example, in WO 1995/35335 or WO 1997/40079.

The vinyl content is understood as meaning the relative proportion of 1,2-linkages of the diene units, based on the sum of the 1,2-, 1,4-cis and 1,4-translinkages. The 1,2-vinyl content of the styrene/butadiene copolymer block (S/B) is preferably less than 20%, in particular in the range from 10 to 18%, particularly preferably in the range of 12-16%.

The unsaturated fractions, in particular those which are derived from butadiene, the S-TPE which can be used as component A) and SBC may also be completely or partly hydrogenated. In the case of (partly) hydrogenated SBC, the proportion of 1,2-linkages of the diene unit before the hydrogenation step may also be up to 60%.

For example, semicrystalline polyolefins, such as homo- or copolymers of ethylene, propylene, 1-butene, 1-pentene, 1-hexene, 4-methyl-1-pentene, and ethylene copolymers with vinyl acetate, vinyl alcohol, ethyl acrylate, butyl acrylate or methacrylate are also suitable as component A). A high density polyethylene (HDPE), low density polyethylene (LDPE), linear low density polyethylene (LLDPE), polypropylene (PP), ethylene/vinyl acetate copolymer (EVA) or ethylene/acrylate copolymer is preferably used as component A). A particularly preferred component A) is polypropylene.

Polycarbonates suitable as component A) preferably have a molecular weight (weight average $M_w$, determined by means of gel permeation chromatography in tetrahydrofuran against polystyrene standards) in the range from 10 000 to 60 000 g/mol. They are obtainable, for example, according to the process of DE-B-1 300 266 by interfacial polycondensation or according to the process of DE-A-1 495 730 by reaction of diphenyl carbonate with bisphenols. A preferred bisphenol is 2,2-di(4-hydroxyphenyl)propane, in general—as also below—referred to as bisphenol A. Instead of bisphenol A, it is also possible to use other aromatic dihydroxy compounds, in particular 2,2-di(4-hydroxyphenyl)pentane, 2,6-dihydroxynaphthalene, 4,4'-dihydroxydiphenyl sulfane, 4,4'-dihydroxydiphenyl ether, 4,4'-dihydroxydiphenyl sulfite, 4,4'-dihydroxydiphenylmethane, 1,1-di-(4-hydroxyphenyl)ethane, 4,4-dihydroxybiphenyl or dihydroxydiphenylcycloalkanes, preferably dihydroxydiphenylcyclohexanes or dihydroxylcyclopentanes, in particular 1,1-bis(4-hydroxyphenyl)-3,3,5-trimethylcyclohexane, and mixtures of the abovementioned dihydroxy compounds.

Particularly preferred polycarbonates are those based on bisphenol A or bisphenol A together with up to 80 mol % of the abovementioned aromatic dihydroxy compounds.

Polycarbonates particularly suitable as component A) are those which comprise units which are derived from resorcinol or alkylresorcinol esters, as described, for example, in WO 2000/61664, WO 2000/15718 or WO 2000/26274; such polycarbonates are sold, for example, by General Electric Company under the brand SoIIX®.

It is also possible to use copolycarbonates according to U.S. Pat. No. 3,737,409; of particular interest there are copolycarbonates based on bisphenol A and di(3,5-dimethyl-dihydroxyphenyl) sulfone, which are distinguished by a high heat distortion resistance. Furthermore, it is possible to use a mixture of the different polycarbonates.

The average molecular weights (weight average $M_w$, determined by means of gel permeation chromatography in tetrahydrofuran against polystyrene standards) of the polycarbonates are, according to the invention, in the range from 10 000 to 64 000 g/mol. They are preferably in the range from 15 000 to 63 000, in particular in the range from 15 000 to 60 000, g/mol. This means that the polycarbonates have relative solution viscosities in the range from 1.1 to 1.3, measured in 0.5% strength by weight solution in dichloromethane at 25° C., preferably from 1.15 to 1.33. The relative solution viscosities of the polycarbonates used preferably differ by not more than 0.05, in particular not more than 0.04.

The polycarbonates can be used both as milled material and in granulated form.

In general, any aromatic or aliphatic thermoplastic polyurethane is suitable as component A); amorphous aliphatic thermoplastic polyurethanes which are transparent are preferably suitable. Aliphatic thermoplastic polyurethanes and the preparation thereof are known to the person skilled in the art, for example from EP-A1 567 883 or DE-A 10321081, and are commercially available, for example under the brands Texin® and Desmopan® from Bayer Aktiengesellschaft.
Component B):

The thermoplastic molding materials which can be prepared by the processes according to the invention comprise, as component B), a flameproofing mixture comprising expandable graphite B1).

In a preferred embodiment of the invention, the thermoplastic molding materials which can be prepared by the processes according to the invention comprise B1) expandable graphite,
B2) one or more flameproofing compounds comprising phosphorus and
B3) a fluorine-containing polymer.

The molding materials which can be prepared by the processes according to the invention comprise, as component B1), expandable graphite known to the person skilled in the art and described in the literature, so-called exfoliated graphite (heat-expandable graphite). This is derived as a rule from natural or synthetic graphite. The exfoliated graphite is obtainable, for example, by oxidation of natural and/or synthetic graphite. $H_2O_2$ or nitric acid in sulfuric acid can be used as oxidizing agents. Furthermore, the exfoliated graphite can be prepared by reduction, for example with sodium naphthalenide in an aprotic organic solvent.

Owing to its layer lattice structure, graphite is capable of forming special forms of intercalation compounds. In these so-called interstitial compounds, foreign atoms or foreign molecules have been included in the spaces between the carbon atoms in stoichiometric ratios in some cases. The surface of the exfoliated graphite can be coated with a coating material, for example with silane sizes known to the person skilled in the art, for better compatibility with the thermoplastic matrix.

Where the exfoliated graphite was obtained by the above-mentioned oxidation, it may be necessary to add an alkaline compound since otherwise (owing to the acid present), the exfoliated graphite may cause corrosion of the molding materials and/or storage and preparation apparatuses of such molding materials. In particular, alkali metal compounds $Mg(OH)_2$ or aluminum hydroxides may be added in amounts up to 10, preferably up to 5, % by weight (based on 100% by weight of B1). The mixing is advantageously effected before the components are compounded.

The heat expansion of the exfoliated graphite on rapid heating from room temperature to 800° C. (in the direction of the c axis of the crystal) is preferably at least 100 ml/g, preferably at least 110 ml/g (so-called specific volume change).

What is important for the suitability as a flameproofing agent is that the exfoliated graphite does not greatly expand at temperatures below 270° C., preferably below 280° C. This is understood by the person skilled in the art as meaning that the exfoliated graphite undergoes a volume expansion of less than 20% at said temperatures and a period of 10 min.

The coefficient of expansion (as a specific key quantity) means as a rule the difference between the specific volume (ml/g) after heating and the specific volume at 20° C. (room temperature). This is generally measured by the following method: a quartz container is heated to 1000° C. in an electrical melting furnace. 2 g of exfoliated graphite are rapidly introduced into the quartz container and the latter is left for 10 sec in the melting furnace.

The weight of 100 ml of the expanded graphite is measured in order to determine the so-called loosened apparent specific gravity. The inverse value is then the specific volume at this temperature. The specific volume at room temperature is accordingly measured at 20° C. (coefficient of expansion=specific volume after heating−specific volume at 20° C.).

The median particle size $D_{50}$ of the exfoliated graphite (determined from the integral volume distribution as a volume average of the particle sizes, as determined by means of laser light diffraction on a Malvern Mastersizer 2000 on the dry powder; the laser light diffraction gives the integral distribution of the particle diameter of a sample; from this it is possible to determine the percentage of the particles which have a diameter equal to or less than a certain size; the median particle diameter, which is also referred to as $D_{50}$ value of the integral volume distribution, is defined as the particle diameter at which 50% by weight of the particles have a diameter smaller than the diameter which corresponds to the $D_{50}$ value; likewise, 50% by weight of the particles then have a diameter larger than the $D_{50}$ value) is preferably from 10 µm to 1000 µm, preferably from 30 µm to 850 µm, particularly preferably from 200 µm to 700 µm, before the mixing of the melts in the screw extruder. If the median particle sizes are lower, as a rule a sufficient flameproofing effect is not achieved; if they are greater, the mechanical properties of the thermoplastic molding materials are usually adversely affected.

The density of the exfoliated graphite is usually in the range from 0.4 to 2 $g/cm^3$.

The phosphorus-containing compounds of component B2) are organic and inorganic compounds which comprise phosphorus and in which the phosphorus has the valency state from −3 to +5. The valency state is understood as meaning the term "oxidation state" as stated in the Textbook of Inorganic Chemistry by A. F. Hollemann and E. Wiberg, Walter des Gruyter and Co. (1964, 57th to 70th edition), pages 166 to 177. Phosphorus compounds of valency states from −3 to +5 are derived from phosphine (−3), diphosphine (−2), phosphine oxide (−1), elemental phosphorus (+0), hypophosphorous acid (+1), phosphorous acid (+3), hypodiphosphoric acid (+4) and phosphoric acid (+5).

Among a large number of phosphorus-containing compounds suitable as component B2), in particular the inorganic or organic phosphates, phosphites, phosphonates, phosphate esters, red phosphorus and triphenylphosphine oxide, only some examples are mentioned. Examples of phosphorus compounds of the phosphine class which have the valency state −3 are aromatic phosphines, such as triphenylphosphine, tritolylphosphine, trinonylphosphine, trinaphthylphosphine and trisnonylphenylphosphine, etc. Triphenylphosphine is particularly suitable.

Examples of phosphorus compounds of the diphosphine class which have the valency state −2 are tetraphenyldiphosphine, tetranaphthyldiphosphine, etc. Tetranaphthyldiphosphine is particularly suitable.

Phosphorus compounds of the valency state −1 are derived from phosphine oxide.

Phosphine oxides of the general formula (I)

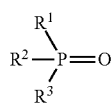

where $R^1$, $R^2$ and $R^3$ in formula (I) are identical or different alkyl, aryl, alkylaryl or cycloalkyl groups having 8 to 40 carbon atoms, are suitable.

Examples of phosphine oxides are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)-phosphine oxide, benzylbis(cyclohexyl)phosphine oxide, benzylbisphenylphosphine oxide, phenylbis(n-hexyl)phosphine oxide. Oxidized reaction products of phosphine with aldehydes, in particular of tert-butylphosphine with glyoxal, are furthermore preferred. Triphenylphosphine oxide, tricyclohexylphosphine oxide, tris(n-octyl)-phosphine oxide and tris(cyanoethyl)phosphine oxide are particularly preferably used, in particular triphenylphosphine oxide. Triphenylphosphine sulfide and its above-described derivatives of phosphine oxides are also suitable.

Phosphorus of valency state ±0 is elemental phosphorus. Red and black phosphorus are suitable. Red phosphorus is preferred.

Phosphorus compounds of "oxidation state"+1 are, for example, hypophosphites of purely organic nature, e.g. organic hypophosphites, such as cellulose hypophosphite esters, esters of hypophosphorous acids with diols, such as, for example, of 1,10-dodecyldiol. Substituted phosphinic acids and the anhydrides thereof, such as, for example, diphenylphosphinic acid, may also be used. Furthermore, diphenylphosphinic acid, di-p-tolylphosphinic acid, dicresylphosphinic anhydride are suitable. However, compounds such as hydroquinone, ethylene glycol, and propylene glycol esters of bis(diphenylphosphinic acid) are also suitable. Aryl(alkyl)phosphinamides, such as, for example, diphenylphosphinic acid dimethylamide, and sulfonamidoaryl(alkyl)phosphinic acid derivatives, such as, for example, p-tolylsulfonamidodiphenylphosphinic acid, are furthermore suitable. Hydroquinone and ethylene glycol esters of bis(diphenylphosphinic acid) and the bisdiphenylphosphinate of hydroquinone are preferably used.

Phosphorus compounds of oxidation state +3 are derived from phosphorous acid. Cyclic phosphonates which are derived from pentaerythritol, neopentylglycol or pyrocatechol, such as, for example, compounds according to formula (II)

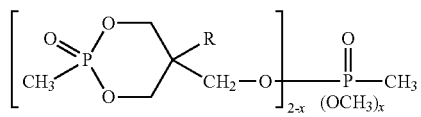

where R is a $C_1$- to $C_4$-alkyl radical, preferably methyl radical, x is 0 or 1 (e.g. Amgard® P 45 from Albright & Wilson), are suitable.

Furthermore, phosphorus of valency state +3 is present in triaryl(alkyl)phosphites, such as, for example, triphenyl phosphite, tris(4-decylphenyl)phosphite, tris(2,4-di-tert-butylphenyl)phosphite or phenyl didecyl phosphite, etc. However, diphosphites, such as, for example, propylene glycol 1,2-bis(diphosphite), or cyclic phosphites, which are derived from pentaerythritol, neopentyl glycol or pyrocatechol are also suitable.

Methyl neopentyl glycol phosphonate and phosphite and dimethyl pentaerythrityl diphosphonate and phosphite are particularly preferred.

Hypodiphosphates, such as, for example, tetraphenyl hypodiphosphate or bisneopentyl hypodiphosphate, are especially suitable as phosphorus compounds of oxidation state +4.

Alkyl- and aryl-substituted phosphates are especially suitable as phosphorus compounds of oxidation state +5. Examples are phenyl bisdodecyl phosphate, phenyl ethyl hydrogen phosphate, phenyl bis(3,5,5-trimethylhexyl)phosphate, ethyl diphenyl phosphate, 2-ethylhexyl ditolyl phosphate, diphenyl hydrogen phosphate, bis(2-ethylhexyl) p-tolyl phosphate, tritolyl phosphate, bis(2-ethylhexyl) phenyl phosphate, dinonyl phenyl phosphate, phenyl methyl hydrogen phosphate, didodecyl p-tolyl phosphate, p-tolyl bis (2,5,5-trimethylhexyl)phosphate or 2-ethylhexyl diphenyl phosphate. Phosphorus compounds in which each radical is an aryloxy radical are particularly suitable. Triphenyl phosphate and resorcinol bis(diphenylphosphate) and the derivatives thereof which are substituted on the nucleus and are of the general formula (III) (RDP):

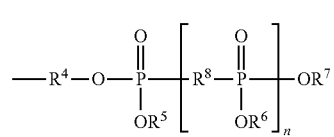

in which the substituents in formula (III) have the following meaning:
$R^4$-$R^7$ are an aromatic radical having 6 to 20 carbon atoms, preferably a phenyl radical, which may be substituted by alkyl groups having 1 to 4 carbon atoms, preferably methyl,
$R^8$ is a divalent phenol radical, preferably

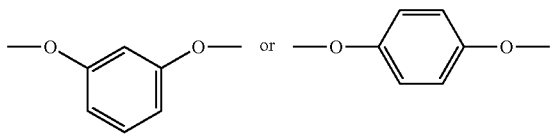

and n has an average value of from 0.1 to 100, preferably from 0.5 to 50, in particular from 0.8 to 10 and very particularly from 1 to 5,
are very particularly suitable.

The commercially available RDP products under the trademark Fyroflex or Fyrol®-RDP (Akzo) and CR 733-S (Daihachi) are, as a result of the production process, mixtures of about 85% of RDP (n=1) with about 2.5% of triphenyl phosphate and about 12.5% of oligomeric fractions in which the degree of oligomerization is generally less than 10.

Furthermore, cyclic phosphates may also be used. Diphenyl pentaerythrityl diphosphate and phenyl neopentyl phosphate are particularly suitable here.

In addition to the abovementioned low molecular weight phosphorus compounds, oligomeric and polymeric phosphorus compounds are also suitable.

Such polymeric, halogen-free organic phosphorus compounds having phosphorus in the polymer chain form, for example, in the preparation of pentacyclic, unsaturated phosphine dihalides, as described, for example, in DE-A 20 36 173. The molecular weight, measured by vapor pressure osmometry in dimethylformamide, of the polyphospholine oxides should be in the range from 500 to 7000, preferably in the range from 700 to 2000.

Here, the phosphorus has the oxidation state −1.

It is furthermore possible to use inorganic coordination polymers of aryl(alkyl)phosphinic acids, such as, for example, poly-β-sodium(I) methylphenylphosphinate. Their preparation is stated in DE-A 31 40 520. The phosphorus has the oxidation number +1.

Furthermore, such halogen-free polymeric phosphorus compounds can form by the reaction of a phosphonyl chloride, such as, for example, phenyl-, methyl-, propyl-, styryl- and vinylphosphonyl dichloride, with bifunctional phenols, such as, for example, hydroquinone, resorcinol, 2,3,5-trimethylhydroquinone, bisphenol A or tetramethyl-bisphenol A.

Further halogen-free polymeric phosphorus compounds which may be present in the molding materials according to the invention are prepared by reaction of phosphoryl chloride or phosphoric acid ester dichlorides with a mixture of mono-, bi- and trifunctional phenols and other compounds carrying hydroxyl groups (cf. Houben-Weyl-Müller, Thieme-Verlag Stuttgart, Organische Phosphorverbindungen, part II (1963)). Furthermore, polymeric phosphonates can be prepared by transesterification reactions of phosphonic acid esters with bifunctional phenols (cf. DE-A 29 25 208) or by reactions of phosphonic acid esters with diamines or diamides or hydrazides (cf. U.S. Pat. No. 4,403,075). However, the inorganic poly(ammonium phosphate) is also suitable.

It is also possible to use oligomeric pentaerythrityl phosphites, phosphates and phosphonates according to EP-B00 8 486, e.g. Mobil Antiblaze® 19 (registered mark of Mobil Oil) (cf. formulae (IV) and (V)):

(IV)

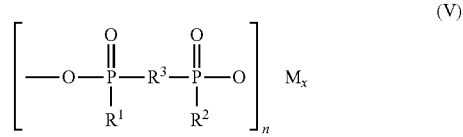

(V)

where the substituents in the formulae (IV) and (V) have the following meaning:
$R^1$, $R^2$ are hydrogen, $C_1$- to $C_6$-alkyl which optionally comprises a hydroxyl group, preferably $C_1$- to $C_4$-alkyl, linear or branched, e.g. methyl, ethyl, n-propyl, isopropyl, n-butyl, tert-butyl, n-pentyl; phenyl; preferably at least one radical $R^1$ or $R^2$, in particular $R^1$ and $R^2$, being hydrogen;
$R^3$ is $C_1$- to $C_{10}$-alkylene, linear or branched, e.g. methylene, ethylene, n-propylene, isopropylene, n-butylene, tert-butylene, n-pentylene, n-octylene, n-dodecylene;
arylene, e.g. phenylene, naphthylene;
alkylarylene, e.g. methylphenylene, ethylphenylene, tert-butylphenylene, methylnaphthylene, ethylnaphthylene, tert-butylnaphthylene;
arylalkylene, e.g. phenylmethylene, phenylethylene, phenylpropylene, phenylbutylene;
M is an alkali earth metal, alkali metal, Al, Zn, Fe or boron;
m is an integer from 1 to 3;
n is an integer from 1 to 3 and
x is 1 or 2.

Compounds of the formula IV in which $R^1$ and $R^2$ are hydrogen, M preferably being Ca, Zn or Al are particularly preferred and calcium phosphinate is a very particularly preferred compound. Such products are commercially available, for example as calcium phosphinate.

Suitable salts of the formula IV or V in which only one radical $R^1$ or $R^2$ is hydrogen are, for example salts of phenylphosphinic acid, the Na and/or Ca salts thereof being preferred.

Further preferred salts have an alkyl radical $R^1$ and/or $R^2$ containing a hydroxyl group. These are obtainable, for example, by hydroxymethylation. Preferred compounds are Ca, Zn and Al salts.

The median particle size $D_{50}$ of the component B2) (determined as described in the case of the median particle size $D_{50}$ of the expandable graphite B1)) is preferably less than 10 μm, preferably less than 7 μm and in particular less than 5 μm.

The $D_{10}$ value is preferably less than 4 μm, in particular 3 μm and very particularly preferably less than 2 μm. Preferred $D_{90}$ values are less than 40 μm and in particular less than 30 μm and very particularly preferably less than 20 μm.

Phosphorus compounds of the general formula (VI):

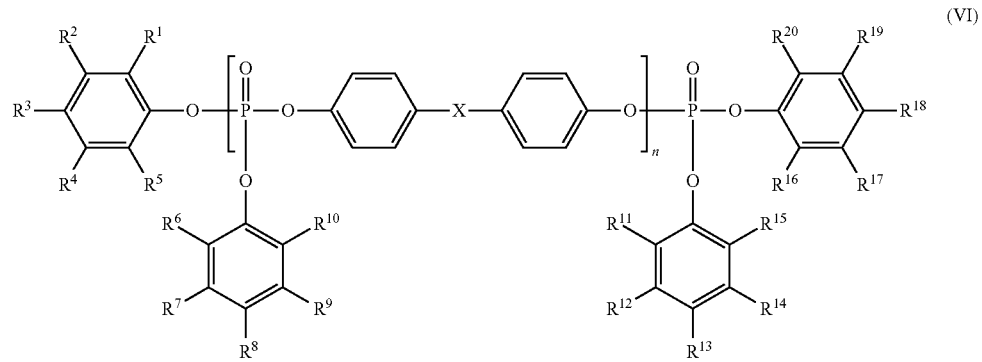

(VI)

where the substituents in formula VI have the following meaning:

$R^1$ to $R^{20}$, independently of one another, are hydrogen, a linear or branched alkyl group having up to 6 carbon atoms, n has an average value of from 0.5 to 50 and X is a single bond, C=O, S, $SO_2$ or $C(CH_3)_2$, are furthermore preferred.

Preferred compounds B2) are those of the formula VI in which $R^1$ to $R^{20}$, independently of one another, are hydrogen and/or a methyl radical. Where $R^1$ to $R^{20}$, independently of one another, are a methyl radical, preferred compounds are those in which the radicals $R^1$, $R^5$, $R^6$, $R^{10}$, $R^{11}$, $R^{15}$, $R^{16}$, $R^{20}$ in the ortho position relative to the oxygen of the phosphate group are at least one methyl radical. Compounds B2) in which one methyl group, preferably in the ortho position, is present per aromatic ring and the other radicals are hydrogen are furthermore preferred.

$SO_2$ and S are particularly preferred as substituents, and very particularly preferably $C(CH_3)_2$ for X in the above formula (VI).

In the above formula (VI), the average value of n is preferably from 0.5 to 5, in particular from 0.7 to 2 and in particular about 1.

n as an average value arises from the preparation process of the abovementioned compounds, so that the degree of oligomerization is generally less than 10 and a small proportion (generally <5% by weight) of triphenyl phosphate are present, this differing from batch to batch. Such compounds B2) are commercially available as CR-741 from Daihachi.

The molding materials comprise a fluorine-containing polymer as component B3). The fluorine-containing ethylene polymers are preferred. These are polymers of ethylene having a fluorine content of from 55 to 76% by weight, preferably from 70 to 76% by weight.

Examples of these are polytetrafluoroethylene (PTFE), tetrafluoroethylene/hexafluoro-propylene copolymer or tetrafluoroethylene copolymers with smaller proportions (as a rule up to 50% by weight) of copolymerizable ethylenically unsaturated monomers. These are described, for example, by Schildknecht in "Vinyl and Related Polymers", Wiley Publishers, 1952, pages 484 to 494, and by Wall in "Fluoropolymers" (Wiley Interscience, 1972).

These fluorine-containing ethylene polymers are present homogeneously distributed in the molding materials and preferably have a median particle size $D_{50}$ in the range from 0.05 to 10 μm, in particular from 0.1 to 5 μm. These small particle sizes can be particularly preferably achieved by using aqueous dispersions of fluorine-containing ethylene polymers and incorporating them into a polymer melt.

Component C):

The thermoplastic molding materials which can be prepared by the processes according to the invention may comprise one or more additives—differing from the components A) and B)—as component C). In principle, all additives customary for plastic which are known to the person skilled in the art and described in the literature are suitable. In the context of the present invention, additives customary for plastic are, for example, stabilizers and antioxidants, heat stabilizers and agents to prevent decomposition by ultraviolet light, lubricants and demolding agents, dyes and pigments and plasticizers and fibers, for example glass fibers or carbon fibers.

Antioxidants and heat stabilizers which may be added to the thermoplastic molding material according to the invention are, for example, halides of metals of group I of the Periodic Table of the Elements, e.g. sodium, potassium and lithium halides. Zinc fluoride and zinc chloride may furthermore be used. Sterically hindered phenols, hydroquinones, substituted members of this group, secondary aromatic amines, optionally in combination with phosphorus-containing acids or salts thereof, and mixtures of these compounds, preferably in concentrations of up to 1% by weight, based on the weight of the thermoplastic molding materials, can furthermore be used.

Together with the antioxidants and heat stabilizers mentioned above by way of example, what are known as costabilizers may be used, in particular phosphorus- and sulfur-containing costabilizers. Such P- and S-containing costabilizers are known to the person skilled in the art and are commercially available. Examples which may be mentioned here are e.g. Irganox PS 800, Irganox PS 802 and Irgaphos 168.

Examples of UV stabilizers are different substituted resorcinols, salicylates, benzotriazoles and benzophenones, which are generally used in amounts of up to 2% by weight, based on the weight of the thermoplastic molding materials.

Lubricants and demolding agents, which as a rule may be added in amounts of up to 1% by weight, based on the weight of the thermoplastic molding materials, are stearic acid, stearyl alcohol, alkyl stearates and stearamides and esters of pentaerythritol with long-chain fatty acids. It is also possible to use calcium, zinc or aluminum salts of stearic acid and dialkyl ketones, e.g. distearyl ketone. Zinc, magnesium and calcium stearate and N,N'-ethylenebisstearamide are particularly suitable according to the invention.

All glass fibers known to the person skilled in the art and described in the literature may be used as glass fibers in the molding materials according to the invention (cf. for example Milewski, J. V., Katz, H. S. "Handbook of Reinforcements for Plastics", page 233 et seq., Van Nostrand Reinholt Company Inc, 1987).

Preparation Process:

The thermoplastic molding materials are prepared by mixing melts of the components A), B) and, if present, C) in a screw extruder, the screw extruder comprising at least one metering zone, one plasticating zone, one homogenization zone, at least one further metering zone and one discharge zone in this sequence along the conveying direction.

Suitable screw extruders are described, for example, in Saechtling, Kunststoff-Taschenbuch, Hanser Publishers, Munich, Vienna, edition 26, 1995, pages 191 to 246.

Screw extruders usually have sections of different function, so-called zones. The different zones of the screw extruders are not necessarily identical to the individual components, such as barrel parts or screw segments from which the screw extruders are assembled. As a rule, a zone consists of a plurality of components. Depending on the function, the individual zones may have different spatial dimensions, for example different lengths or volumes. Usually, screw extruders have one or more of the zones described below. In addition, however, screw extruders may also have zones whose function is not explicitly described below.

Metering zone is to be understood as meaning that section of a screw extruder in which one or more components, for example a thermoplastically processable polymer, are fed to the screw extruder. This feed can be effected by means of a metering apparatus, for example, a continuously operating balance (loss-of-weight system) out of which the material to be metered is conveyed by means of a conveying screw into an opening at the top of the screw extruder, for example with attached hopper, so that the component to be metered enters the screw extruder under the force of gravity. However, the metering apparatus can, for example, also consist of a conveying screw or an extruder by means of which the component to be metered is forced laterally through a metering opening into the screw extruder. In principle, the metering zone may consist of one or more top-situated or side openings with the associated peripherals, such as balances, side feed extruder metering screws, or else a melt line. In addition to gravimetric metering, volumetric metering is also common when the bulk density is known. Also possible and customary is the metering of liquid components via pumps, examples being Mohno pumps, gear pumps or piston pumps (depending on the consistency and viscosity of the liquid).

The plasticating zone (often also referred to as melting zone) is to be understood as meaning that section of a screw extruder in which a component, in particular component A), is brought into a thermoformable, generally molten or plastically deformable, state. As a rule, this is achieved by heating and/or mechanically introduced energy. The components familiar to the person skilled in the art are suitable as plasticating elements for introducing mechanical energy, for example screw elements having a small pitch in the conveying direction, kneading blocks having narrow or broad, conveying or nonconveying kneading disks, screw elements having a pitch opposite to the conveying direction, or a combination of such elements. With regard to their type, number and dimensioning, the choice of the plasticating elements in the plasticating zone depends on the components of the thermoplastic molding materials, in particular on the viscosity and softening temperature and the miscibility of the components.

Homogenization zone is to be understood as meaning that section of a screw extruder in which one or more components, of which at least one is in the thermoformable state, are homogenized. This homogenization is generally effected by mixing, kneading or shearing. Suitable mixing, kneading and shearing elements are, for example, the means already described as plasticating elements.

In addition, suitable homogenization elements are combinations of conveying, nonconveying and back-conveying kneading blocks which may consist of narrow or broad kneading disks or combinations thereof. Homogenization elements which are also suitable are so-called toothed disks which may also be equipped with conveying or nonconveying teeth, or so-called toothed mixing elements in which, for example, the thread is not continuous but consists of a number of teeth; these toothed mixing elements, too, may be conveying or nonconveying. Further homogenization elements known to the person skilled in the art are so-called SMEs, screws having interrupted threads, blister disks and various types of special elements which are commercially available from different extruder manufacturers. Plasticating zone and homogenization zone may be spatially separate from one another, but they may also merge continuously with one another.

The discharge zone is to be understood as meaning that section of a screw extruder in which the discharge of the thermoplastically processable molding material from the screw extruder is prepared and is carried out through the outlet opening. The discharge zone generally consists of a conveying screw and a closed barrel part which is terminated by a defined outlet opening. The screw pitches in this region are established such that the pressure required for breaking through the outlet opening (die plate) is built up.

A die head which, for example, is in the form of a die plate or die strip is preferably used as the outlet opening, it being possible for the dies to be circular (hole die plate), slot-like or of another design. The product discharged as an extrudate in the case of a die plate is as usual cooled, for example in water, and granulated. Especially with the use of a slot die, cube granulation is possible. If the thermoplastically processable molding materials are not first obtained as granules but are to be directly further used, further processing in the hot state or direct extrusion of sheets, films, tubes and profiles is also advantageous.

A screw extruder can moreover comprise further zones, for example venting or devolatilization zones for removing gaseous constituents or squeeze zones and dewatering zones for separating off and discharging a liquid constituent, which may be water but also other substances. Devolatilization, squeeze and dewatering zones and their design and arrangement in terms of apparatus are described in WO 1998/13412, and reference is therefore expressly made to said publication with regard to these features.

A section of a screw extruder may also combine two or more of said zones. If, for example, a further substance is metered into the homogenization zone of an extruder, the homogenization zone simultaneously acts as a metering zone. In an analogous manner, the other zones among said zones can simultaneously be realized in one section of the screw extruder.

The individual zones may be clearly spatially delimited from one another or may run continuously into one another. Thus, for example in an extruder, the transition from the plasticating zone to the homogenization zone cannot always be clearly delimited spatially. There is often a continuous transition between the two zones.

As is generally known, the various zones of a screw extruder can be individually heated or cooled in order to establish an optimum temperature profile along the conveying direction. Suitable heating and cooling apparatuses are known to the person skilled in the art.

The temperatures and spatial dimensions of the individual zones which are to be chosen in the individual case differ depending on the chemical and physical properties of the components and their ratios. Thus, for example, the mixing temperatures in the homogenization zone are as a rule from 100° C. to 400° C. or, with the use of ABS or ASA as component A), as a rule from 200 to 280° C. It should be noted here that the temperatures set from the outside only have a supporting function. The equilibrium temperatures result from the energy input of the screw shafts and the physical properties of the processed melt.

As already described above, the melt mixing processes according to the invention employ a screw extruder which comprises at least one metering zone, one plasticating zone, one homogenization zone, one further metering zone and one discharge zone in the sequence along the conveying direction.

In an embodiment of the invention, all components of the thermoplastic molding materials—except for the substantial amount of component B1)—can be fed simultaneously to the metering zone of the screw extruder, either spatially separately from one another or together. It is also possible for the individual components of the thermoplastic molding materials—except for the substantial amount of component B1)—to be premixed and to be fed to the metering zone and the remaining components then to be added individually and/or likewise as a mixture behind this metering zone, viewed in the conveying direction.

What is essential to the invention is that the metering of the expandable graphite B1) into the screw extruder, which has a length L, the length L being defined as the section beginning at the first metering means for the addition of components A, B and/or C and ending, in the conveying direction, at the outlet opening of the extruder. The addition of components A, B and C takes place preferably in the region from 0 L to 0.15 L, and in a first process step in the absence of component B1) a melt is produced. The addition of component B1) that follows in the second process step, and its mixed incorporation into the melt comprising components A, B and C, takes place in general in the region from 0.5 L to 0.99 L, preferably in the region from 0.5 L to 0.95 L, more preferably in the region from 0.6 L to 0.9 L, more particularly in the region from 0.7 L to 0.85 L.

Irrespective of the designations "first process step" and "second process step", which serve to clarify that the production of the melt comprising components A, B and C on the one hand and the mixed incorporation of component B1) on the other hand are two events that are separate in time and/or space, the extruder, of course, is operated continuously and preferably in a steady state.

In principle, the metering of the expandable graphite B1) into the screw extruder can therefore also be effected in the metering zone or the plasticating zone itself, but this does not lead to the desired product quality and is thus not in accordance with the invention. According to the invention, plastication and homogenization of the molding materials, essentially consisting of all components except B1, are effected prior to the addition of component B1. The incorporation of component B1 into the remaining thermoplastic melt is preferably effected by straight conveying elements of identical or different pitch.

Advantageously, the metering of the expandable graphite B1) into the screw extruder is therefore effected after the homogenization zone (i.e. the extruder screw can be equipped with shearing elements in the plasticating zone), particularly preferably between homogenization zone and discharge zone (i.e. the extruder screw can be equipped with shearing elements in the plasticating zone and/or the homogenization zone). Shearing elements for the purposes of this specification are those which introduce more shearing energy into the thermoplastic melt than do pure positively conveying elements. Examples include backward-conveying screw elements, forward-, backward- or neutrally conveying kneading blocks with different pitches, corresponding toothed mixing elements and toothed disks, to name a few examples here.

In one particularly preferred embodiment, conveying elements are used that have different pitches, it being possible for the pitches to alternate between steep and shallow and steep again, or else with a continuous increase from shallow to steep.

The expandable graphite B1) can be added in pure form but also as a mixture with other components, for example with a part of components B2 and/or B3 or else additives such as lubricants, stabilizers or a part of the agents listed as component C; preferred is the mixture of B1 and C, particularly preferably B1 in pure form.

The feature that "the extruder screw comprises no shearing elements" means that the extruder screw has only elements, for example conveying elements, which display as small a shearing effect as possible; shearing elements whose substantial function is to introduce shear forces into the conveyed material are generally not present. Shearing elements in the sense of this invention are those which introduce more shearing energy into the thermoplastic melt than do pure positively conveying elements. Examples include backward-conveying screw elements, forward-, backward- or neutrally conveying kneading blocks with different pitches, corresponding toothed mixing elements and toothed disks, blister disks, etc.

Screw extruders used may be single-screw extruders, if component B1 can be metered in according to the invention, or twin-screw extruders which may rotate in the same direction and intermesh, and also those which intermesh in opposite directions and are non-intermeshing. Twin-screw extruders are preferably used. Corotating, intermeshing twin-screw extruders are particularly preferred. It is also possible to use corotating extruders having more than 2 screws, for example have 3, 4, 6 or 12 screws (multishaft extruders).

It is possible to use extruders having screws with a small, medium or large thread depth (so-called "deep-flighted screw"). The thread depth of the screws to be used is dependent on the machine type. The machine type to be used in each case depends on the respective task. Conventional thread depth ratios (Di/Da) are in the range from 0.5 to 5, preferably 0.8 to 3, particularly preferably 1 to 2.2, in particular 1.2 to 1.8=deep-cut.

The number of turns of flight of the screws of the extruder may vary. Double-flight screws are preferably used. However, it is also possible to use screws having other numbers of turns of flight, for example single-flight or three-flight screws, or those screws which have sections with different numbers of turns of flight.

The rotational speeds of the extruder screw may vary within a wide range. Suitable rotational speeds are in the range from 50 to 1200 rpm, preferably from 80 to 1000 rpm, particularly preferably from 100 to 900 rpm.

The thermoplastic molding materials prepared by the processes according to the invention and comprising expandable graphite have an improved combination of flame-retardant and mechanical properties and a markedly lower inherent odor in comparison with known molding materials.

The molding materials prepared according to the invention are suitable for the production of (fibers, films) moldings and foams of any type, preferably for moldings and foams, particularly preferably for moldings, fibers, films, moldings and foams comprising the molding materials prepared according to the invention can be used, for example, as household articles, housing for electrical equipment, consumer electronics and computers, electronic components, medical apparatuses, automotive components and building materials.

The invention is explained in more detail below with reference to examples.

EXAMPLES

Methods of Measurement

The viscosity numbers VN of the styrene-acrylonitrile copolymers were determined in accordance with the standard DIN 53727 in 0.5% strength by weight dimethylformamide solution at 25° C.

The average particle sizes of the graft copolymers used as rubbers were determined as weight averages of the particle sizes, by means of an analytical ultracentrifuge, in accordance with the method of W. Scholtan and H. Lange, Kolloid-Z. and Z.-Polymere 250 (1972), pages 782 to 796.

Fire Test:

In the fire test based on UL 94, vertical burning standard, the first afterburning time t1 was measured on rods having a thickness of 1.6 mm after a first flame application time of 10 seconds. After a second flame application time of 10 seconds 2 seconds following the extinguishing of the flames, the second afterburning time t2 was measured. The sum of the afterburning times t1 and t2 gives the afterburning time $t_A$.

Odor Test:

For the odor test, rods with a thickness of 1.6 mm, of the kind also used for the fire test, were used. The rods were placed in a 500 ml glass vessel with screw closure, and stored in the closed state at 60° C. for 24 h. After cooling to room temperature, an evaluation was made of the odor, on a scale from very poor (−−), poor (−), satisfactory (o), good (+) to very good (++).

Starting Materials:

Components or experiments with the prefix "C-" are not according to the invention and serve for comparison.

Polymer Component A):

The following were used as component A):

A-1-I: a commercially available acrylonitrile/butadiene/styrene copolymer (ABS), Terluran® HI10 from BASF SE, comprising a styrene/acrylonitrile copolymer hard phase and particulate butadiene grafted rubber.

A-1-II: a styrene/acrylonitrile copolymer (SAN) comprising 24% by weight of acrylonitrile and 76% by weight of styrene, having a viscosity number of 64 ml/g.

A-2: A commercially available linear ethylene/methacrylate copolymer, Elvaloy® 1330 EAC, from DuPont de Nemours.

Flameproofing Component B):

The following was used as component B1):

B-1: exfoliated graphite Nord-Min® 503 from Nordmann, Rassmann, GmbH, having a median particle size $D_{50}$ of 465 µm, a free expansion (beginning at about 300° C.) of at least 150 ml/g and a bulk density of 0.5 g/ml at 20° C.

The following were used as component B2):

B-2-I: Disflamoll® TP, a triphenyl phosphate from Lanxess Aktiengesellschaft.

B-2-II: Nord-Min® JLS, an ammonium polyphosphate from Nordmann, Rassmann, GmbH.

B-2-III: Masteret 38450, a red phosphorus masterbatch from Italmatch Chemicals Spa.

The following was used as component B3):

B-3: polytetrafluoroethylene PTFE TE-3893 N, Teflon® dispersion from DuPont de Nemours having a PTFE content of 60% by weight (based on the total weight of the dispersion).

Preparation of the thermoplastic molding materials and determination of their properties:

The following were used as screw extruder (SE):

SE-1:

A 2-shaft laboratory kneader (screw extruder, SE) with a co-rotating pair of screws and a screw diameter of 39 mm (from Berstorff, Hanover) was used that had the following barrel construction:

The barrel length amounted in total to 32 D, distributed over 7 barrel sections and 4 1D intermediate plates; the first section had an upwardly open opening for the metering of the mixture to be compounded, provided with a screw having purely conveying elements (metering zone 1), followed by 2 closed barrels, the predominantly conveying elements, and, in section 3, the melting and mixing zone, with conveying elements and back-conveying kneading blocks, followed by a combination barrel with a laterally mounted metering screw, a further closed barrel, and a further combination barrel with laterally mounted metering screw. There then followed a closed barrel with normally conveying screw threads of different pitches. There then followed the extruder head, with a die lip for discharge. Barrels 4 to 7 were connected to one another by via a 1D intermediate plate. (The length L of the extruder amounted to thirty-two times the screw diameter (32D).

Component B1) was metered via a laterally mounted metering screw (ZSB), which was fed from a continuously operating balance. Once in the metering zone at 45% of the extruder length (C1), and once at around 75% of the extruder length (Ex. 1).

SE-2:

The extruder has the same construction as SE-1. In contrast thereto, component B1 was metered using a continuously operating balance and a hopper, in each case at around 45% (C2) and 75% (Ex. 2) of the extruder length.

SE-3:

Metering took place via a laterally mounted metering screw ZSB, which was fed by a continuously operating metering balance, into the metering zone at around 45% of the extruder length. Starting from the metering point, the extruder screw had conveying elements and also a kneading block and a tooth mixing element (C3).

For inventive example 3, component B1 was metered at 75% of the extruder length via a laterally mounted metering screw ZSB, which was fed by a continuously operating metering balance.

The quantities of components A-C specified in Table 1 were metered into the regions, specified in each case in Table 1, of a continuously operated twin-screw extruder which is in the steady state.

The setpoint barrel temperature of the extruder was room temperature in the intake region, otherwise 210 to 230° C. The throughput was 75 kg/h at 300 rpm. The melt discharged from the extruder was passed through a water bath and pelletized. The properties specified in Table 1 were determined on these pellets or on specimens injection-molded from them.

Component B1 was metered once into the side feed (C-1, C-3) and once through a mounted hopper (C-2) at around 45% of the length of the extruder. In the inventive experiment, under otherwise identical conditions, component B1 was metered into the metering zone at around 75% of the length of the extruder. The properties were determined in accordance with the table submitted. Not only the fire properties but also the odor of the products obtained were better.

TABLE 1

Parts by weight of the components, region of respective metering, and properties of the molding compounds prepared

| | Example* | | | | | |
|---|---|---|---|---|---|---|
| | C-1 | 1 | C-2 | 2 | C-3 | 3 |
| | | | Extruder | | | |
| | SE-1 | SE-1 | SE-2 | SE-2 | SE-3 | SE-3 |
| | Parts by weight | | | | | |
| A-1-I | 54.6 | 54.6 | 54.6 | 54.6 | 54.6 | 54.6 |
| A-1-II | 17 | 17 | 17 | 17 | 17 | 17 |
| A-2 | 10 | 10 | 10 | 10 | 10 | 10 |
| B-1 | 8 | 8 | 8 | 8 | 8 | 8 |
| B-2-I | 4 | 4 | 4 | 4 | 4 | 4 |
| B-2-II | 1 | 1 | 1 | 1 | 1 | 1 |
| B-2-III | 5 | 5 | 5 | 5 | 5 | 5 |
| B-3 | 0.4 | 0.4 | 0.4 | 0.4 | 0.4 | 0.4 |
| | Metering region | | | | | |
| A-1 | 1 | 1 | 1 | 1 | 1 | 1 |
| A-2 | 1 | 1 | 1 | 1 | 1 | 1 |
| B-1 | 4 | 6 | 4 | 6 | 4 | 6 |
| B-2 | 1 | 1 | 1 | 1 | 1 | 1 |
| B-3 | 1 | 1 | 1 | 1 | 1 | 1 |
| | Fire test properties (afterburning time $t_4$)** | | | | | |
| | 1.6 mm fire rods | | | | | |
| Rod 1 | — | 3.1 | — | 2.0 | 30.4 | 2.5 |
| Rod 2 | 4.3 | 2.2 | — | 2.5 | — | 3.0 |
| Rod 3 | 22.7 | 3.6 | — | 2.3 | — | 2.5 |
| Rod 4 | 6.8 | 3.9 | — | 2.2 | 2.9 | 2.1 |
| Rod 5 | 13.2 | 2.5 | — | 2.5 | 29.1 | 2.1 |
| | Odor test | | | | | |
| Rating | − | + | ○ | ++ | − | + |

*examples labeled with "C" are comparative examples
**a line ("—") denotes the complete consumption of the specimen by burning

We claim:
1. A process for the preparation of thermoplastic molding materials comprising:
   A) from 40 to 99% by weight of at least one thermoplastic polymer,
   B) from 1 to 60% by weight of a flameproofing component comprising
   B1) an expandable graphite, and
   C) from 0 to 60% by weight of further additives,
the percentages by weight being based in each case on the total weight of the components A) to C) and together giving 100% by weight,
by mixing melts of the components A), B) and, if present, C) in a screw extruder, the screw extruder comprising at least one metering zone, one plasticating zone, one homogenization zone, one second metering zone and one discharge zone in this sequence along the conveying direction,
wherein the metering into the screw extruder having the length L, the length L being defined as the section beginning at the first metering means for the addition of components A, B and/or C and ending, in the conveying direction, at the exit opening, following addition of components A, B and C in the region from 0 L to 0.15 L in a first process step in the absence of component B1) a melt is produced, and in a second process step after addition of the component B1) in the region from 0.7 L to 0.85 L the mixing of component B1) into this melt is carried out.

2. The process for the preparation of thermoplastic molding materials according to claim 1, wherein the molding material comprises:
   A) from 50 to 95% by weight of component A,
   B) from 5 to 50% by weight of component B, and
   C) from 0 to 45% by weight of component C,
the percentages by weight being based in each case on the total weight of the components A) to C) and together giving 100% by weight.

3. The process for the preparation of thermoplastic molding materials according to claim 1, wherein the molding material comprises:
   A) from 65 to 90% by weight of component A,
   B) from 10 to 35% by weight of component B, and
   C) from 0 to 25% by weight of component C,
the percentages by weight being based in each case on the total weight of the components A) to C) and together giving 100% by weight.

4. The process for the preparation of thermoplastic molding materials according to claim 1, wherein the molding material comprises, as component A), an ABS copolymer and/or an SAN copolymer and/or an ethylene-methacrylate copolymer.

5. The process for the preparation of thermoplastic molding materials according to claim 1, wherein the molding material comprises, as component B, alongside said expandable graphite, at least one of the components B2) or B3),
   wherein B2) is selected from triphenyl phosphate, ammonium polyphosphate, and red phosphorus,
   wherein B3) is selected from PTFE.

6. The process for the preparation of thermoplastic molding materials according to claim 1, wherein the molding material comprises, as component B, alongside said expandable graphite, at least one component B2) selected from triphenyl phosphate, ammonium polyphosphate and red phosphorus, and also, as component B3), PTFE.

7. A thermoplastic molding material which is prepared by a process according to claim 1.

8. A molding, fiber or film comprising a thermoplastic molding material according to claim 7.

9. The process for the preparation of thermoplastic molding materials according to claim 1, wherein, in a second process step, after addition of the component B1) in the region from 0.7 L to 0.85 L the mixing of component B1) into this melt is carried out.

10. The process for the preparation of thermoplastic molding materials according to claim 9, wherein the molding material comprises:
    A) from 50 to 95% by weight of component A,
    B) from 5 to 50% by weight of component B, and
    C) from 0 to 45% by weight of component C,
the percentages by weight being based in each case on the total weight of the components A) to C) and together giving 100% by weight.

11. The process for the preparation of thermoplastic molding materials according to claim 10, wherein the molding material comprises:
    A) from 65 to 90% by weight of component A,
    B) from 10 to 35% by weight of component B, and
    C) from 0 to 25% by weight of component C,
the percentages by weight being based in each case on the total weight of the components A) to C) and together giving 100% by weight.

12. The process for the preparation of thermoplastic molding materials according to claim 9, wherein the molding material comprises, as component A), an ABS copolymer and/or an SAN copolymer and/or an ethylene-methacrylate copolymer.

13. The process for the preparation of thermoplastic molding materials according to claim 9, wherein the molding material comprises, as component B, alongside said expandable graphite, at least one of the components B2) or B3),
    wherein B2) is selected from triphenyl phosphate, ammonium polyphosphate, and red phosphorus,
    wherein B3) is selected from PTFE.

14. The process for the preparation of thermoplastic molding materials according to claim 9, wherein the molding material comprises, as component B, alongside said expandable graphite, at least one component B2) selected from triphenyl phosphate, ammonium polyphosphate and red phosphorus, and also, as component B3), PTFE.

15. A thermoplastic molding material which is prepared by a process according to claim 9.

16. A molding, fiber or film comprising a thermoplastic molding material according to claim 15.

17. The process for the preparation of thermoplastic molding materials according to claim 1, wherein the addition of component B1) is effected by straight conveying elements of different pitch.

* * * * *